US00RE36197E

United States Patent [19]

Walker

[11] E Patent Number: Re. 36,197

[45] Reissued Date of Patent: Apr. 27, 1999

[54] HAND-HELD LIGHT PROJECTOR FOR PRODUCING LIGHT SHOW

[76] Inventor: Brian Walker, 63420 Old Deschutes Rd., Bend, Oreg. 97701

[21] Appl. No.: 09/032,898

[22] Filed: Feb. 27, 1998

Related U.S. Patent Documents

Reissue of:

[64] Patent No.: 5,526,076
Issued: Jun. 11, 1996
Appl. No.: 08/490,999
Filed: Jun. 15, 1995

[51] Int. Cl.[6] ..... G03B 21/28

[52] U.S. Cl. ..... 353/43; 353/51; 353/99

[58] Field of Search ..... 353/46, 48, 51, 353/50, 1, 2, 42, 43, 98, 99; 359/616, 617; 446/485; 362/297

[56] References Cited

U.S. PATENT DOCUMENTS

| | | | |
|---|---|---|---|
| 3,609,339 | 9/1971 | Smith | 353/1 |
| 3,892,478 | 7/1975 | Lampkin | 353/99 |
| 3,990,772 | 11/1976 | Knott | 359/617 |
| 4,010,361 | 3/1977 | Latterman et al. | 353/1 |
| 4,196,461 | 4/1980 | Geary | 353/1 |
| 4,756,614 | 7/1988 | Kato et al. | 353/43 |
| 4,814,800 | 3/1989 | Lavinsky et al. | 353/50 |

*Primary Examiner*—William Dowling
*Attorney, Agent, or Firm*—Blakely, Sokoloff, Taylor & Zafman LLP

[57] ABSTRACT

A hand-held light projector adapted to create on a remote display screen a light show presenting Lissajous figures whose patterns depend on how the projector is shaken by the operator. The projector includes a light bulb whose rays are focused to form a light beam that is directed onto a first spring-mounted mirror that when the projector is shaken, then oscillates about a horizontal axis, the beam deflected by the first mirror being cast on a second spring-mounted mirror that oscillates about a vertical axis. The beam deflected by the second mirror is cast on and scans the remote screen to produce a light trace thereon whose path is the resultant of the concurrent oscillations of the two mirrors to create on the screen Lissajous figures whose patterns depend on the frequencies and amplitudes of the oscillations.

17 Claims, 4 Drawing Sheets

FIG. 6
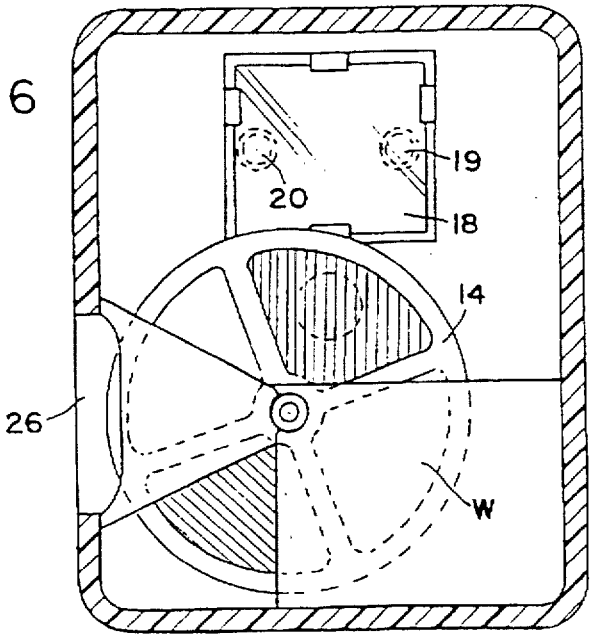
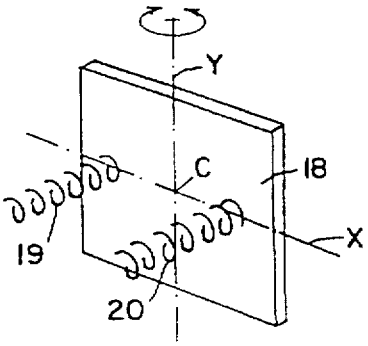
FIG. 8
FIG. 10
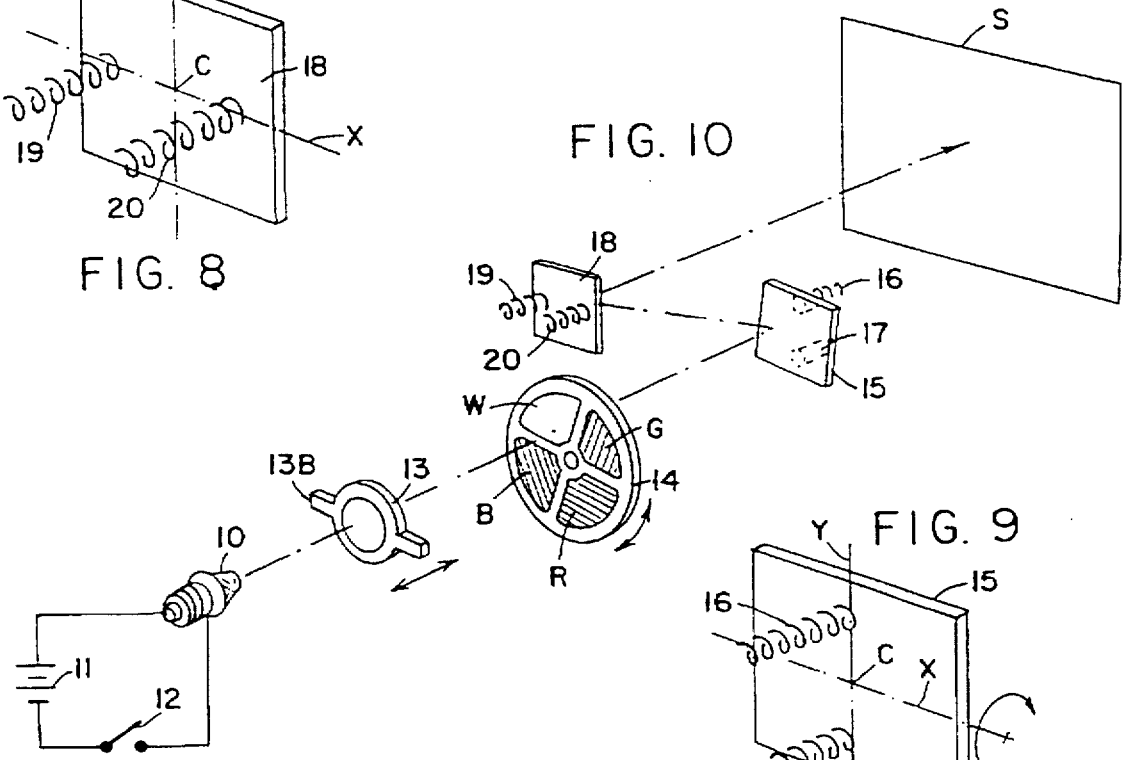
FIG. 9
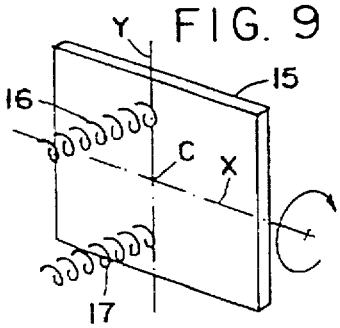

HAND-HELD LIGHT PROJECTOR FOR PRODUCING LIGHT SHOW

Matter enclosed in heavy brackets [ ] appears in the original patent but forms no part of this reissue specification; matter printed in italics indicates the additions made by reissue.

BACKGROUND OF INVENTION

1. Field of Invention

This invention relates generally to a light projector adapted to create a light show on a remote surface serving as a display screen, and more particularly to a hand-held light projector which when shaken by an operator produces on the screen Lissajous figures in varying patterns and in a selected color, thereby creating a light show whose nature depends on how the projector is shaken by the operator.

2. Status of Prior Art

In a cathode-ray oscilloscope, an electron beam is projected through vertical and horizontal deflection plates onto a phosphorescent screen to produce a light trace whose path is the resultant of the right-angle vertical and horizontal deflection forces.

A cathode-ray (C-R) oscilloscope is useable as a frequency comparison instrument to determine the frequency of an unknown wave by visually comparing it with a wave of known frequency. If the horizontal and vertical coordinates of a point are each given by a a sinusoidal wave function of time, the path traced by this point is no longer a sine wave, but varies with the relative time phase of the sine waves and with their relative frequencies.

Thus if the two waves have the same frequency and are in time phase or are 180 degrees out of phase, then the resultant trace on the C-R screen a straight line. But for all other values of phase displacement, the trace creates an ellipse which becomes a circle when the waves have equal amplitudes and are 90 degrees displaced in phase. When the frequencies of the two waves are not the same, the resultant pattern is more complicated, and may have a figure of eight or a more complex shape. These shapes or patterns are known in the oscilloscope art as Lissajous figures.

A light projector in accordance with the invention, makes no use of an electron beam as in a C-R tube, but provides an analogous operation in which a light beam is deflected concurrently in the horizontal and vertical directions to create Lissajous figures on a remote display screen. In practice, this screen may be an ordinary wall in a room.

A light projector in accordance with the invention may make use of an ordinary incandescent bulb whose light rays must be focused to produce a light beam coming to a point on the display screen to trace a light pattern thereon.

Alternatively, use may be made for the same purpose of a laser beam projector such as that disclosed in the Kimble et al. U.S. Pat. No. 4,102,059 in which a coherent light beam is generated and therefore requires no focusing to come to a point. However, a laser beam light projector in accordance with the invention, though it includes no focusing lens, is more costly than a projector using an incandescent bulb.

SUMMARY OF INVENTION

In view of the foregoing, the main object of this invention is to provide a hand-held light projector which when shaken by an operator, creates on any remote surface capable of functioning as a display screen, a light show formed by random Lissajous figures whose patterns or shapes depend on how the projector is shaken by an operator.

A significant advantage of a light projector in accordance with the invention is that it produces a light show that is entertaining and fascinating to watch, for the Lissajous figures displayed on the screen continue to change unpredictably in shape and complexity.

Also an object of the invention is to provide a light projector of the above type that includes a color wheel formed by segments of different color so that the figures presented on the display screen are in a color determined by the color of the operative segment of the wheel.

Yet another object of the invention is to provide a light projector of the above type that includes an adjustable focusing lens to focus the beam on the remote surface of the viewing screen.

Briefly stated, these objects are accomplished by a hand-held light projector adapted to create on a remote display screen a light show presenting Lissajous figures whose patterns depend on how the projector is shaken by the operator. The projector includes a light bulb whose rays are focused to form a light beam that is directed onto a first spring-mounted mirror that when the projector is shaken, then oscillates about a horizontal axis, the beam deflected by the [final] *first* mirror being cast on a second spring mounted mirror that oscillates about a vertical axis. The beam deflected by the second mirror is cast on and scans the remote screen to produce a light trace[.] thereon whose path is the resultant of the concurrent oscillations of the two mirrors to create on the screen Lissajous figures whose patterns depend on the frequencies and amplitudes of the oscillations.

BRIEF DESCRIPTION OF DRAWINGS

For a better understanding of the invention reference is made to the detailed description to follow which is to be read in conjunction with the accompanying drawings of which:

FIG. 6 is a transverse section taken in the plane indicated by lines 6—6 in FIG. 5;

FIG. 8 shows the mirror which oscillates about a vertical axis;

FIG. 9 shows the mirror which oscillates about a horizontal axis; and

FIG. 10 is a schematic drawing of the elements which together create the projector.

DETAILED DESCRIPTION OF INVENTION

Figure 1:
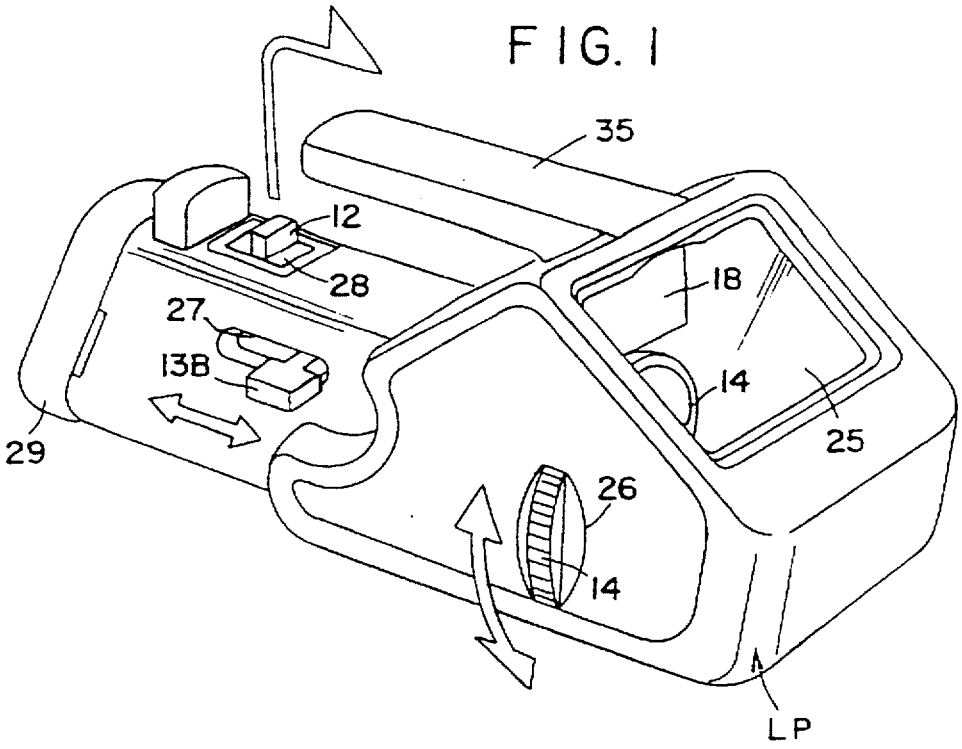
FIG. 1 is a perspective view of a hand-held light projector in accordance with the invention.

Reference is first made to FIG. 10 of the drawings, for this schematically illustrates the several components of a light projector in accordance with the invention and how they cooperate to produce a light show on a remote screen. All of these components are integrated into a single hand-held unit as shown in FIG. 1.

The light source for the projector is provided by a small incandescent flashlight bulb 10 connected to a pair of serially connected batteries 11, through an on-off switch 12. When switch 12 is closed and the bulb energized, its light rays are focused by a focusing lens 13 having handle bars 13B so that the lens may be shifted along its optical axis to produce a light beam that comes to a point on a remote surface S, such as a room wall or ceiling that serves as a display screen for the light show presented by the projector.

The light beam emerging from lens 13 is projected through whatever segment of a rotatable color wheel 14 is then in line with the beam. Wheel 14 is formed with four triangular segments of like size. One segment has a blue filter B installed therein, the second segment has a green filter G installed therein, the third segment has a red filter R installed therein, and the fourth segment W is blank and therefore yields white light. Hence the color of the light beam projected on display surface S depends on which segment of the color wheel is aligned with the light beam by an operator who turns the wheel.

The light beam of the selected color passing through color wheel 14 is intercepted by a first small square mirror 15 (shown separately in FIG. 9) that is mounted on a pair of helical springs 16 and 17 placed along a vertical axis Y above and below a horizontal axis X passing through the center C of the mirror. Hence when the projector which is hand-held is shaken by an operator,mirror 15 then proceeds to oscillate about horizontal axis X as springs 16 and 17 alternately compress and expand. The frequency of oscillation is relatively stable, for it depends on the resonance characteristics of the spring-mounted mass. But the amplitude of oscillation depends on how vigorously the projector is shaken. This amplitude gradually diminishes until the projector is again shaken.

A child can play with projector LP on any available surface, including a ceiling, as long as the room is darkened so that the light trace from the projector is clearly visible. With a laser beam projector, the light trace will be more intensive and, therefore, effective even when the room is not darkened.

As shown in FIG. 1, light projector LP is housed in a plastic casing similar to that of a heavy duty flashlight; the enlarged front section of the casing having an inclined outlet provided with a clear plastic window 25 through which the beam deflected by second mirror 18 is projected. A slot 26 in a wide wall of the front section exposes the periphery of color wheel 14 so that it can be turned by an operator to align a desired color segment with the beam and thereby produce a light show in the selected color.

The handle bar 13B [if] *of* focusing lens 13 projects through an elongated slot 27 in the side wall of the rear section of the casing. Thus an operator can bring the beam to a focus by shifting the lens axially forward or back to an extent limited by the slot. Projecting through a slot 28 in the upper side of the rear section of the casing is the actuator of switch 12. The rear section of the casing which contains a battery compartment is closed by a removable cap 29.

Figure 2:
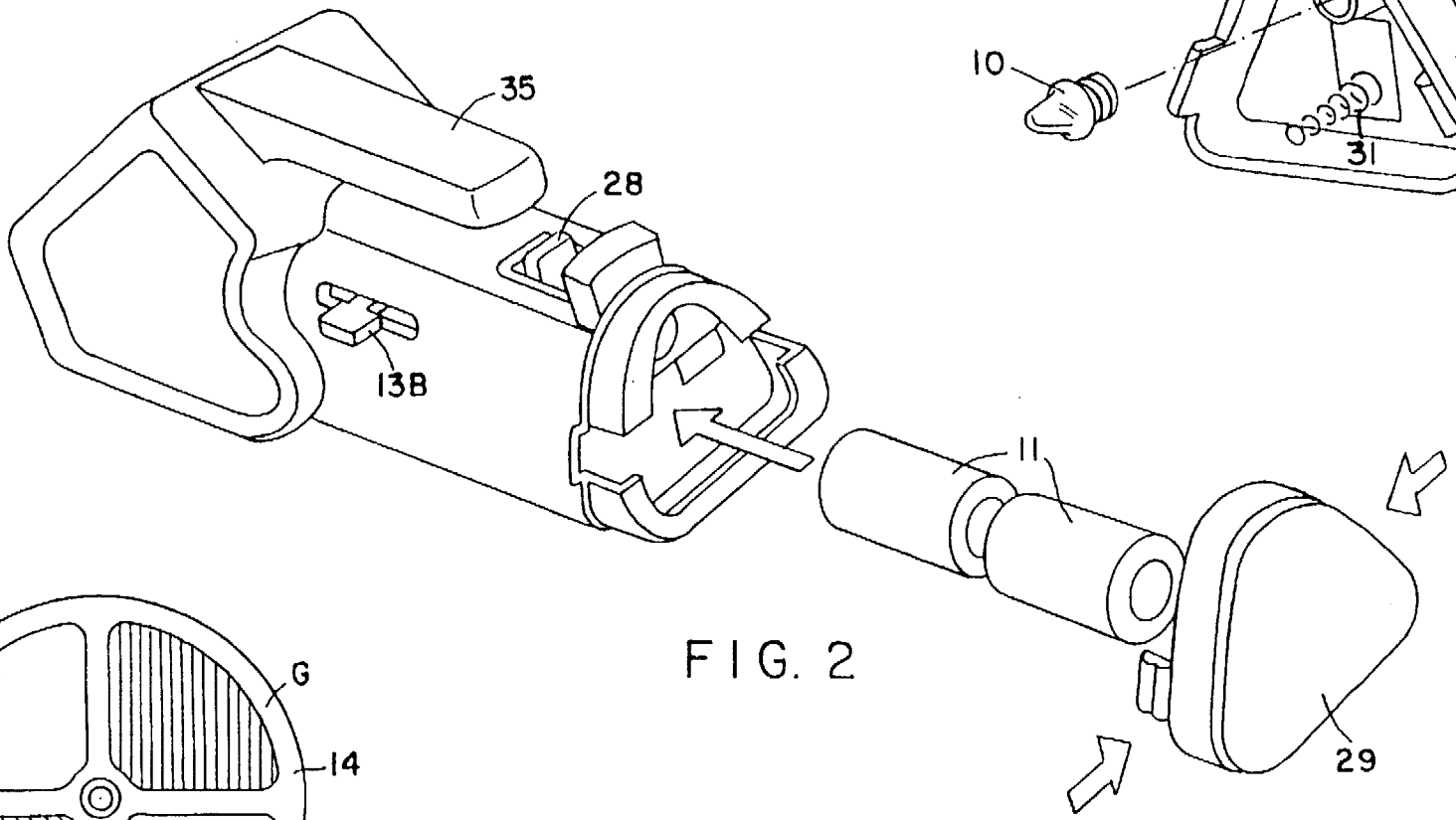
FIG. 2 shows the rear cap withdrawn from the projector so that batteries for housing the light bulb may be inserted in a battery compartment.
Figure 7:
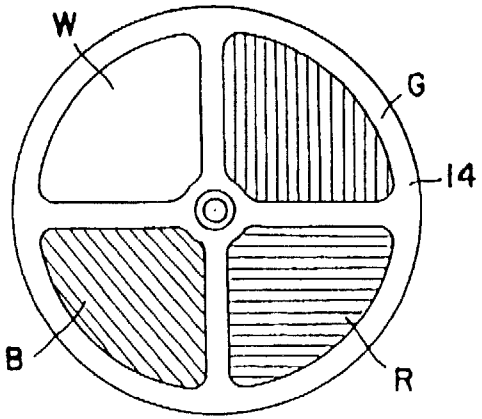
FIG. 7 is a separate view of the light wheel included in the projector.
Figure 5:
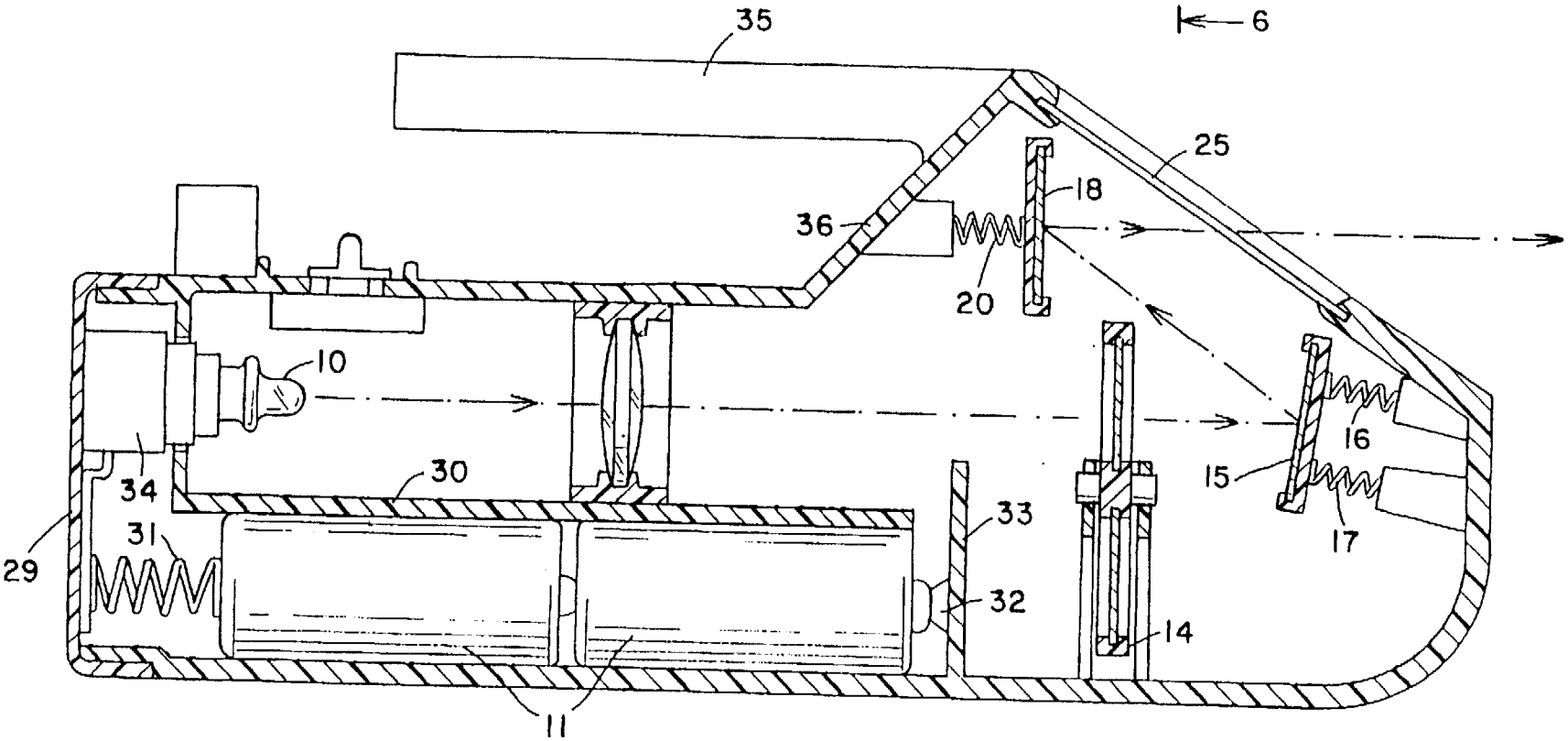
FIG. 5 is a longitudinal section taken through the projector which exposes all of the operating components.

To install batteries 11 in the battery compartment of the casing cap 29 is removed, as shown in FIG. 2, to permit the batteries to be inserted in series in the battery compartment 30 as shown in FIG. 5. The rear pole of the battery series is engaged by a spring contact 31 mounted on the inner wall of cap 29, while the front pole is engaged by a fixed contact 32 mounted on a plastic upright plate 33. Contacts 31 and 32 are connected to a socket 34 for bulb 10 to apply the voltage of the batteries to the bulb.

Figure 3:
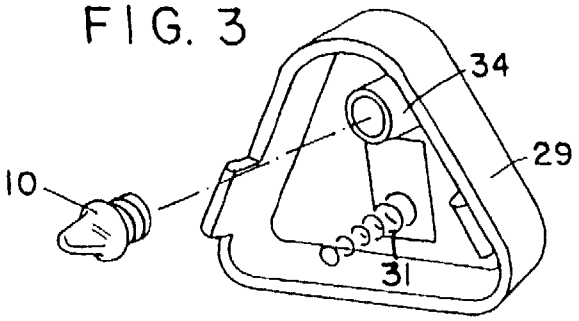
FIG. 3 shows the manner in which a light bulb is socketed on the rear cap.

As shown separately in FIG. 3, contact spring 31 and bulb socket 34 are supported on the inner wall of removable cap 29, hence it is an easy matter to replace the bulb and the batteries, when necessary to do so. Extending rearwardly the front section of the casing is a bar-shaped handle 35 which is grasped by a hand of the operator so that the projector can be pointed at the display screen surface and also shaken to activate the light show.

Figure 4:
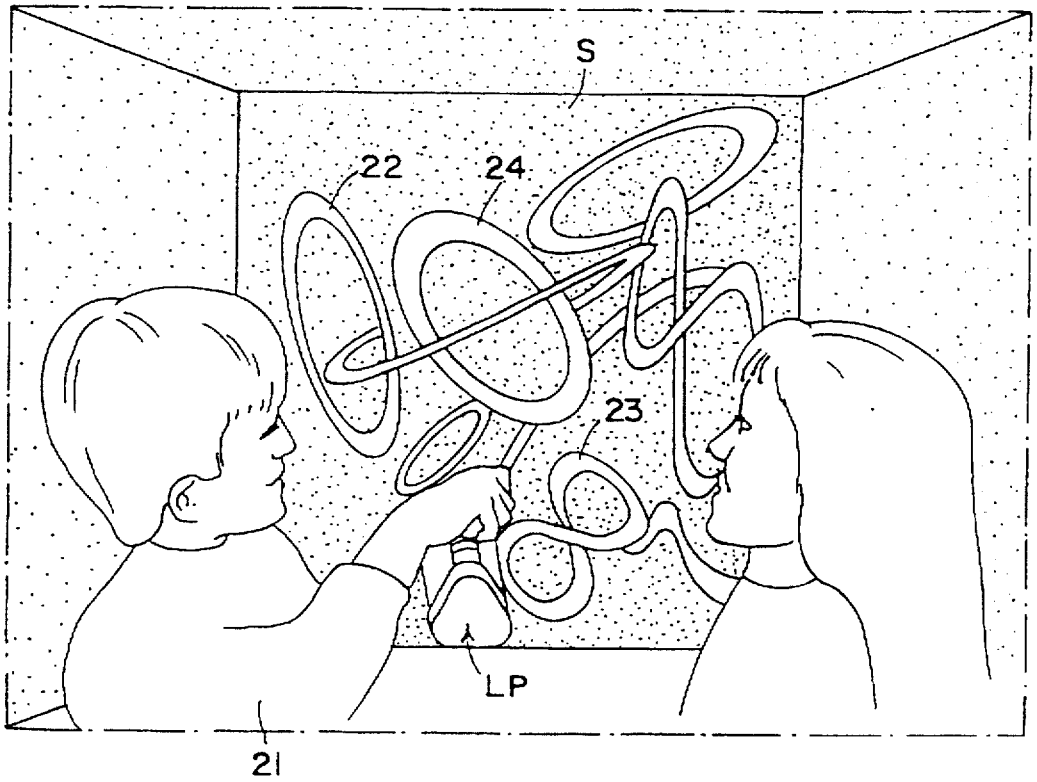
FIG. 4 illustrates Lissajous light figures created on the wall of a room by the light projector.

While FIG. 4 illustrates a display screen showing several Lissajous figures, it is to be understood that only one figure is presented at a time at a position on the screen that depends on where the projector beam is pointed. It is also to be noted that the pattern formed by the Lissajous figure undergoes continual change, for the oscillating mirrors which produce the Lissajous figures do not oscillate at a constant amplitude or at a constant frequency. Hence the light show is highly varied, unpredictable and visually entertaining.

While there has been shown a preferred embodiment of a light projector in accordance with the invention, it will be appreciated that many changes may be made therein without departing form the spirit of the invention.

I claim:

1. A hand-held projector for creating on a remote screen a light show presenting to a viewer Lissajous figures whose patterns depend on how the projector is shaken by an operator said projector comprising:

A. means producing a light beam which comes to a point on said screen;

B. a spring-mounted first mirror intercepting said light beam, said first mirror oscillating about a horizontal axis when the projector is shaken to deflect said beam with respect to said axis; and C. a spring-mounted second mirror intercepting the beam deflected by the first mirror and concurrently oscillating about a vertical axis whereby the beam deflected by the second mirror is deflected with respect to the vertical axis and is directed toward said screen whereby the point on the screen traces a path whose course is the resultant of the horizontal and vertical deflections and creates said Lissajous figures.

2. A projector as set forth in claim 1, in which said first and second mirrors are housed within a front section of a casing having a window through which the beam deflected by the second mirror passes.

3. A projector as set forth in claim 2, in which said means to produce a light beam includes a battery-operated flashlight bulb whose rays are focused by a lens to produce said beam.

4. A projector as set forth in claim 3, in which the position of the lens is axially adjustable to bring said beam to a focus on said screen.

5. A projector as set forth in claim 1, in which said first mirror is mounted on a pair of helical springs placed along a vertical axis on opposite sides of a horizontal axis passing through the center of the mirror.

6. A projector as set forth in claim 1, in which the said second mirror is mounted on a pair of helical springs placed along a horizontal axis on opposite sides of a vertical axis passing through the center of the mirror.

7. A projector as set forth in a claim 1, further including a color wheel interposed between said light producing means and said first mirror to impart a color to the light beam.

8. A projector as set forth in claim 1, in which the color wheel is divided into four segments, each providing a different color, the color of the beam depending on which segment is aligned with the beam.

9. A projector as set forth in claim 8, in which the wheel has a periphery which is engaged by an operator's finger.

*10. A projector as set forth in claim 1, wherein the light beam is a laser beam.*

*11. A hand-held projector for creating on a remote screen a light show presenting to a viewer Lissajous figures whose patterns depend on how the projector is shaken by an operator said projector comprising:*

*A. means producing a light beam; and*

*B. a spring-mounted mirror intercepting said light beam, said mirror oscillating about at least one axis when the projector is shaken to deflect said beam with respect to said at least one axis whereby the light beam traces a path whose course is the resultant of the deflections and creates said Lissajous figures.*

*12. A projector as set forth in claim 11, wherein the light beam is a laser beam.*

*13. A projector as set forth in claim 11, further comprising a second mirror intercepting said light beam so as to direct said light beam to said spring-mounted mirror.*

*14. A light projection apparatus comprising:*

*A. a housing having a window;*

*B. a light source for producing a light beam within the housing; and*

*C. a mirror disposed within the housing to intercept said light beam, said mirror being spring-mounted such that shaking of the housing induces oscillatory motion of the mirror, thereby deflecting the light beam in an oscillatory pattern.*

*15. A projector as set forth in claim 14, wherein the light beam is a laser beam.*

*16. A projector as set forth in claim 14, wherein said mirror is a first mirror reflecting said light beam through said window and further comprising a second mirror intercepting said light beam from said light source and directing said light beam to said first mirror.*

*17. A projector as set forth in claim 14, wherein said mirror is a first mirror and further comprising a second mirror, said first mirror intercepting said light beam from said light source and directing said light beam to said second mirror, said second mirror reflecting said light beam through said window.*

* * * * *